US006183018B1

(12) United States Patent
Braun et al.

(10) Patent No.: US 6,183,018 B1
(45) Date of Patent: Feb. 6, 2001

(54) DATA CARRIER WITH OPTICALLY VARIABLE COLOR

(75) Inventors: Eckhard Braun; Reinhard Plaschka, both of München (DE)

(73) Assignee: Giesecke & Devrient GmbH (DE)

(*) Notice: Under 35 U.S.C. 154(b), the term of this patent shall be extended for 0 days.

(21) Appl. No.: 09/068,984

(22) PCT Filed: Nov. 26, 1996

(86) PCT No.: PCT/EP96/05229

§ 371 Date: Sep. 21, 1998

§ 102(e) Date: Sep. 21, 1998

(87) PCT Pub. No.: WO97/19818

PCT Pub. Date: Jun. 5, 1997

(30) Foreign Application Priority Data

Nov. 27, 1995 (DE) .............................................. 195 44 130

(51) Int. Cl.[7] .............................. G06K 7/10; G06K 9/74; G06K 19/14; G06K 19/16

(52) U.S. Cl. .............................. 283/114; 283/86; 283/91; 283/94; 283/109; 427/7

(58) Field of Search .................................. 427/7; 283/86, 283/91, 94, 109, 114

(56) References Cited

U.S. PATENT DOCUMENTS 4,514,085 4/1985 Kaye .
5,808,758 * 9/1998 Solmsdorf .............................. 283/91

FOREIGN PATENT DOCUMENTS 0 642 933 A1 3/1995 (EP) .
2 283 456A 5/1995 (GB) .

* cited by examiner

*Primary Examiner*—A. L. Wellington
*Assistant Examiner*—Mark T. Henderson
(74) *Attorney, Agent, or Firm*—Bacon & Thomas PLLC

(57) ABSTRACT

A data carrier with an optically variable element. The optically variable element includes a first structured print which is overlaid with a second print, at least in partial areas. The second print is applied to a document with an ink which contains an optically variable pigment having little or no body color of its own.

21 Claims, 4 Drawing Sheets

DATA CARRIER WITH OPTICALLY VARIABLE COLOR

BACKGROUND OF THE INVENTION

1. Field of the Invention

This invention relates to a data carrier, in particular a paper of value, identity card or the like, which is provided with an optically variable security element having optically variable pigments without, or with only weak, body color of their own.

2. Description of the Prior Art

There have been manifold efforts lately to mark data carriers and protect them from falsification or forgery. In particular the improved quality of photocopiers has caused optically variable elements to be increasingly applied to security documents whose optically variable effect is not reproducible by copying machines.

For example it is known from EP 0 317 514 A1 to apply to a document a layer with iridescent substances which conveys a different color effect at different viewing angles. It is in particular proposed that the iridescent substance be applied flat to a subjacent, black, all-over layer. In a further working step the thus produced iridescent surface can be overlaid with information by overprinting this surface.

EP 0 435 029 A3 furthermore discloses the use of liquid-crystal polymers as optically variable elements whereby a color tilting effect arises upon a change of viewing or lighting angle. This effect is based substantially on the helical structure of the liquid-crystal phase, which can be fixed by crosslinking in polymers and furthermore adjusted via external conditions, such as mechanical pretreatment. This also makes it possible to selectively adjust the color tone of the color change.

SUMMARY OF THE INVENTION

The problem to be solved by the invention is to propose a data carrier, and a method for producing it, which has a novel optical effect and thus increased protection from forgery.

The invention is based on the idea of first providing the document with information contrasting with the data carrier, such as a finely structured print. One then provides this information with an optically variable effect by applying a transparent layer having an optically variable effect over at least a partial area of the information. One can use in particular transparent optically variable layers having optically variable pigments without, or with only slight, body color of their own. One can furthermore use other transparent optically variable layers, such as interference layer structures or optically variable foils such as liquid-crystal silicone polymer foils.

The layer having an optically variable effect can be applied according to the invention by coating, transfer printing, another manner of application, applying a foil or imprinting. The invention will be described by way of example using imprinting, but the abovementioned other techniques can also be used analogously for applying the optically variable layer.

When conventional coloring pigments are used to apply structured prints to a data carrier, the inventive method offers the possibility of providing this information with an optically variable effect For this purpose the information is provided flat at least in partial areas with a transparent, optically variable layer having e.g. an optically variable pigment without, or with only slight, body color of its own.

The lack of body color in the optically variable pigments makes these pigments especially effective at the places where the first ink is located on the data carrier as a structured background. In contrast, the optically variable effect is not, or only hardly, visible at the places where no background print is present. When the abovementioned optically variable pigments are used in inks, the width or fineness of the producible structures is limited and is considerably greater than the line thicknesses achievable with conventional pigments, since the optically variable pigments are much larger than conventional pigments so that one cannot produce information as a high-resolution structure by directly printing the pigments. Furthermore the size of the optically variable pigments makes them unprintable by screen printing as of a certain mesh width of the screen, so that this technique cannot be used to produce a high-resolution structure anyway. It is therefore to be regarded as a particular advantage of the inventive method that this technique can now be used to provide even high-resolution structures with an optically variable effect when the high-resolution structures are printed with the first ink and then covered with the ink containing the optically variable pigment.

The invention accordingly achieves the advantage of providing the document with a high-resolution fine structure which furthermore has a previously unknown optically variable effect for the viewer. The inventive procedure offers the further advantage that the formation of the fine structure is decoupled from the formation of the optically variable effect, so that the pigments optimized for the case of application can be used for the particular desired effect.

BRIEF DESCRIPTION OF THE DRAWINGS

Further advantages and developments can be found in the subordinate claims and in the following figures, whose representation is not true to scale for clarity's sake.

DETAILED DESCRIPTION OF THE PREFERRED EMBODIMENT

Figure 1:
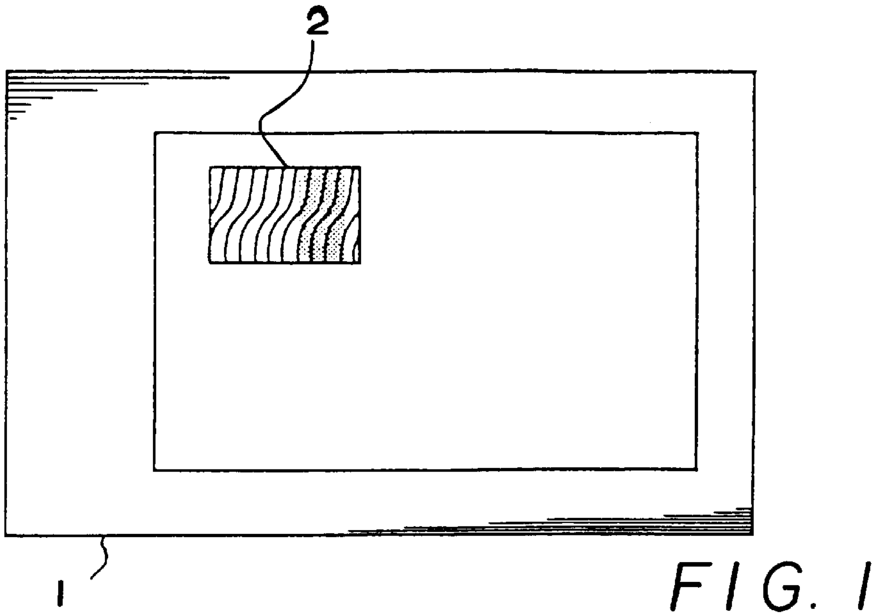
FIG. 1 shows an inventive data carrier.

FIG. 1 shows inventive data carrier 1, in the present case a bank note, with security element 2 applied thereto, security element 2 is positioned at a suitable place on the data carrier 1 so that its optical effect leads to easy testability of the data carrier, on the one hand, and prevents attempts at forgery, in particular with color copying machines, on the other hand.

Figure 2:
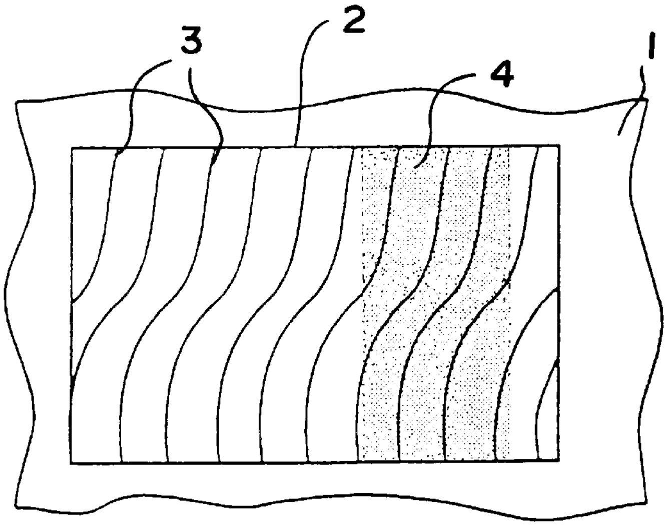
FIG. 2 shows an inventive optically variable security element.

FIG. 2 shows an enlarged detail of inventive data carrier 1 in the area of the optically variable element. Optically variable element 2 consists of a print of lines 3 in a color contrasting with the data carrier. The print can be for example a fine, high-resolution line pattern or screen. Over lines 3 the substance with the optically variable pigments is applied in area 4. Suitable inks are in particular ones which contain optically variable pigments and are printed flat. Outside printed lines 3 the optically variable pigments in area 4 are not, or only extremely weakly, recognizable because of their lack of body color. On lines 3, however, the optically variable pigments are fully effective so that the high-resolution printed pattern is overlaid with an optically variable effect which can be clearly recognized solely in the areas of the printed pattern. The selection of inks for printing lines 3 on the data carrier is subject only to the restriction that these inks must be suitable for producing the structure, which depends essentially on the desired line fineness. With regard to the coloring, lines 3 of the structure can be adapted to the particular requirements. However it has turned out that particularly dark colors make area 4 (a superjacent flat print of the optically variable pigments especially effective. Furthermore high-resolution structure 3 can vary in color and/or in the particular color tones. This leads to different effects of the superjacent optically variable pigments in area 4. One can thus produce effects, such as a certain color shade as exists e.g. in a halftone image, and transfer them to the superjacent layer containing optically variable pigments.

Figure 3:
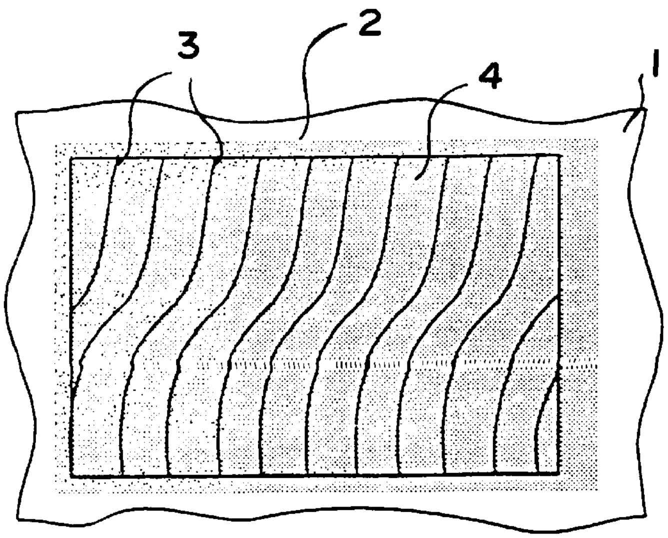
FIG. 3 shows a further embodiment of the invention optically variable security element.
Figure 4:
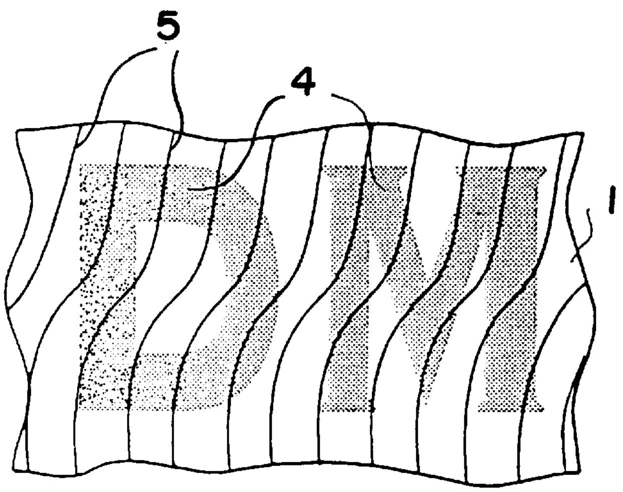
FIG. 4 shows a further embodiment of the inventive optically variable security element.

In such cases it is favorable to overprint lines 3 in their entirety with an ink containing optically variable pigments, as shown in FIG. 3. This makes it possible to transfer the total information content of the picture, logo, character or the like produced by the structuring of the first print to the optical efficacy of the superjacent optically variable pigment. If the structure of the first ink is designed accordingly, e.g. as a halftone image, it is thus possible to transform the halftone image information of the halftone image into picture information with differently iridescent picture values through the flat overprint with coloring pigments without, or with only slight, body color of their own. The iridescent effect of the printed optically variable pigments is determined by the particular subjacent color value and/or intensity value of the high-resolution structure, Additional protection from forgery results if first print 3 is a high-resolution structure. As indicated by FIG. 4, inventive data carrier 1 can also be designed in such a way that a high-resolution line structure already present on the data carrier is used for producing the optically variable element. One can overprint high-resolution printed lines 5, which are executed for example as guilloches or high-resolution lines of a picture motif, with the optically variable coloring pigments at least in a partial area. Area 4 constituted by an overprint can be executed as a geometric shape or as characters, so that background lines 5 produce an optically variable print with a tilting effect in the area of overprint 4.

Figure 5:
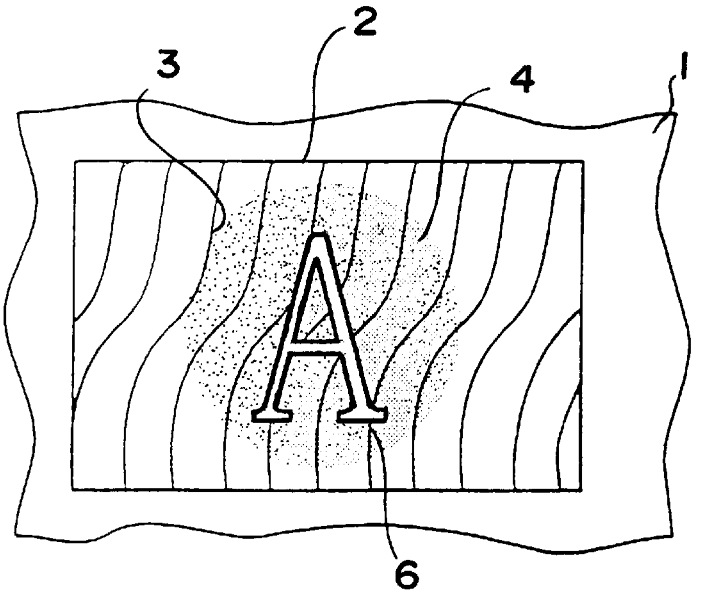
FIG. 5 shows an embodiment of the inventive optically variable security element.

FIG. 5 shows data carrier 1 having optically variable security element 2. Overprint lines 3 again printed on and possibly of high resolution is covered in area 4 by an ink with optically variable pigments applied flat. Within area 4 there is further information 6 which is represented in the present case by the letter “A”. This information can be produced in area 4 for example by embossing or printing. For embossing one can use conventional steel gravure printing methods with or without ink. For printing the information it is possible to produce the information clearly against an iridescent background by selecting the ink so that it completely covers the optically variable background. However the ink of print 6 can also be selected from the group of transparent or translucent colors, so that optically variable background 4 is retained in the area of information 6 but modified in comparison with its immediate surroundings.

Figure 6:
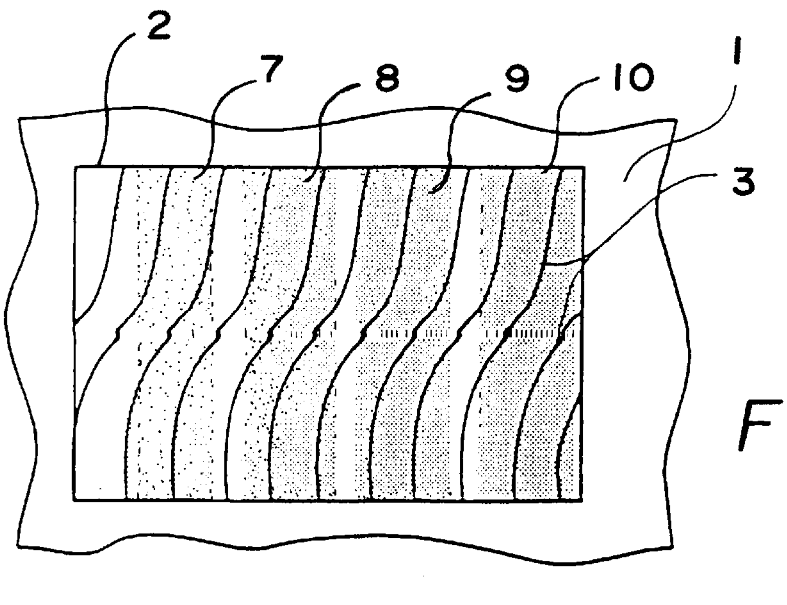
FIG. 6 shows an embodiment of the inventive optically variable security element.

FIG. 6 shows a further example of inventive data carrier 1 to which optically variable element 2 is applied. Lines 3 of the first ink again present, which can be single- or multicolored, are covered by several single areas 7, 8, 9 and 10. Single areas 7 to 10 are produced by printing an ink containing an optically variable pigment, the pigments again being recognizable in the areas where for example high-resolution structure, lines 3 extend thereunder. Individual areas 7 to 10 can contain different optically variable pigments in this embodiment and thus each produce a different impression on the viewer, This makes it possible for optically variable areas 7 to 10 to carry an information content themselves, which consists in the simplest case or a certain color sequence. This information content is then influenced, or actually made visible, by the particular structure or the first print located under the optically variable colors.

Figure 7:
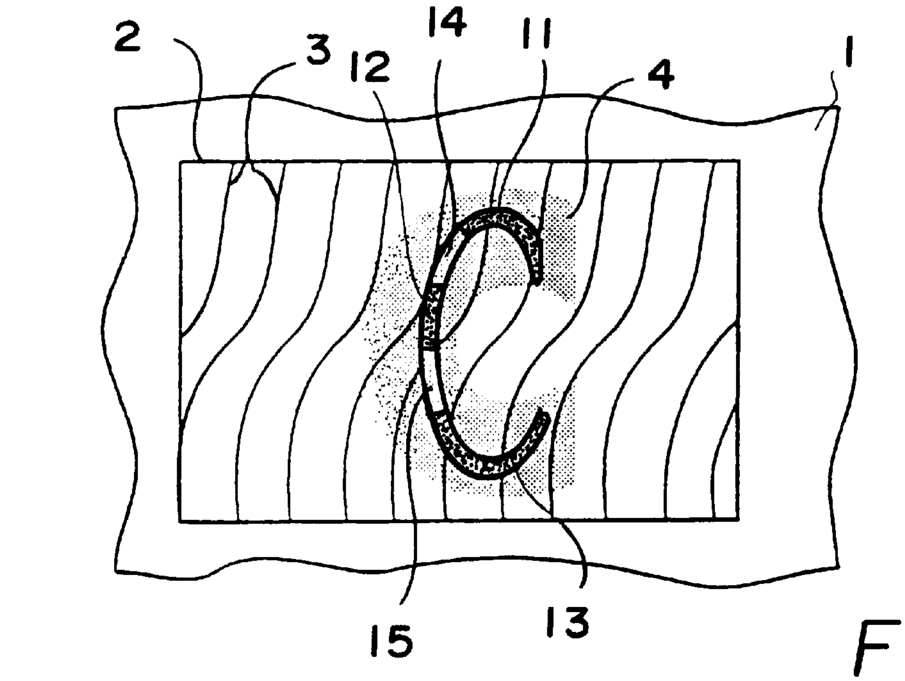
FIG. 7 shows an embodiment of the inventive optically variable security element.

The inventive optically variable element can also be combined with the back of the document, as shown in FIG. 7, so that complete information only appears by transmitted light, For this purpose optically variable element 2 is applied to data carrier 1, a structured print again being first applied to the data carrier in a first ink of any desired kind. This is printed flat with the optically variable color in area 4, which is executed as the letter “C” in the present case. Within area 4 elements 11, 12, 13 are incorporated by embossing or printing in such a way as to be recognizable by reflected light. The back of the document is printed or embossed in exact register in the area of optically variable element 2 in such a way that two elements 14 and 15 are furthermore recognizable by transmitted light, which yield total information together with elements 11, 12 and 13 when the document is viewed by transmitted light.

The particular property of the viewing angle-dependent, optically variable color overprints can also be used advantageously in combination with further security elements. For example the inventive security element can be linked with a combination of an embossed structure with an embossed line pattern as known basically from CA 1 019 012 to form a total element which has fully novel properties.

Figure 8:
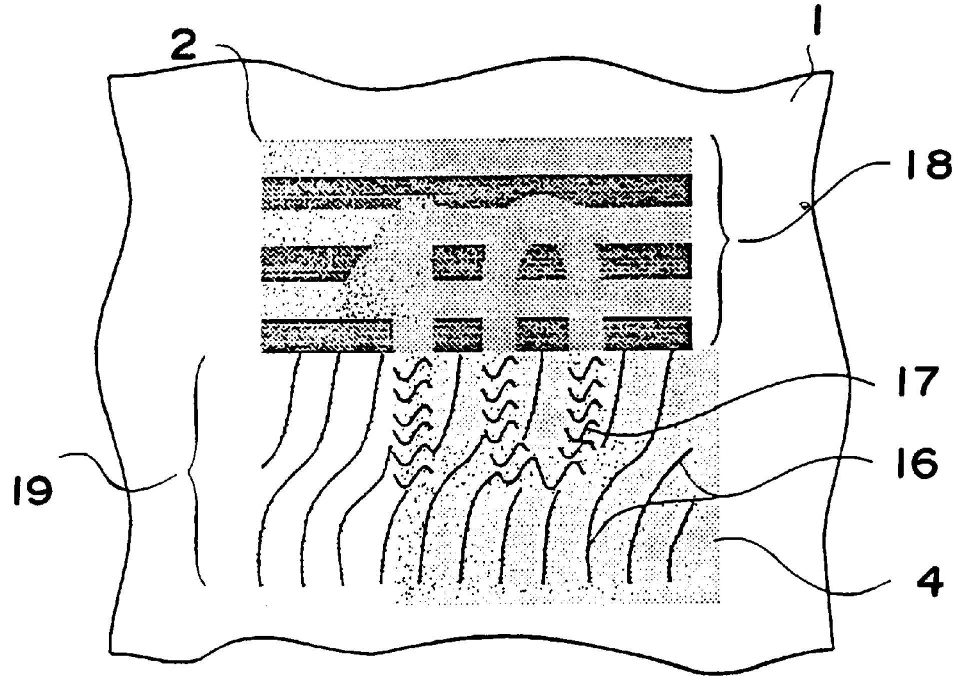
FIG. 8 shows an inventive optically variable security element by transmitted light.

FIG. 8 shows a preferred embodiment in this connection. Optically variable element 2 applied to data carrier 1 consists of several components. Lines 16 of a first high-resolution structure are first printed. In the area of this printed structure other lines 17 of a second high-resolution structure are then printed which differ from the first in their color, shape or the direction of the printed lines. Second applied high-resolution structure 17 forms a first part of information incorporated in the optically variable element, in the following case the bottom part of the numeral “10”. A further surface area of the optically variable element is formed by the combination of an embossing and a line pattern as basically known from CA 1 019 012, lines being printed which are recognizable differently in area 18 when viewed at different viewing angles because of an additionally applied embossing. Unembossed area 19 is covered all over with a substance, in particular an ink, which again has an optically variable pigment without, or with only weak, body color of its own. Lines 16 and 17 of the optically variable element thus have a viewing angle-dependent color effect. Part 18 of the optically variable element contains the partial information supplementing print 17, which is applied in exact register and is clearly visible only at certain viewing angles because of the embossing and the line pattern. Thus partial information 17 is visible at all viewing angles, but a different color effect is produced depending on the viewing angle. Area 18 of the optically variable security element contains the supplementary partial information, which is clearly visible only when the data carrier is tilted.

Figure 9:
FIG. 9 shows an embodiment of the inventive optically variable security element.

FIG. 9 shows a further example of an inventive data carrier. A high-resolution portrait consisting of fine lines 20 is first printed on data carrier 1 by steel gravure printing. To produce the inventive effect one overlays this steel gravure portrait completely or partly with the identical picture in coarser resolution, for example in broader lines 21, using optically variable colors for the second picture so that the high-resolution steel engraving has an optically variable effect associated therewith. Along with overprinting the high-resolution steel engraving flat with optically variable colors, the latter technique provides the possibility of associating an optically variable impression with the steel engraved portrait despite the use of less optically variable colors.

The preceding examples show that the embodiments based on the idea of the invention lead to a great number of specific design possibilities. These can in turn also be combined with one another or with other known optical security elements for data carriers. To produce the first structured print one can apply a suitable ink. It is furthermore possible to produce a structure by removing certain partial areas from a flat print. One can do so using etching techniques, on one hand, but also other methods, for example the laser ablation method. Producing the structure with the help of a laser can also be regarded as printing in this context. In all preceding embodiments the print can be of high resolution, single- or multicolored and with different color tones in each case. In especially advantageous embodiments the structure is produced as a line pattern or screen, dot pattern or screen, halftone image or the like.

In the abovementioned embodiments it has furthermore turned out that the brilliance of the optically variable effect can be increased further by smoothing the background before or after applying the optically variable colors.

The high-resolution fine structure can also be applied as a so-called "negative structure", a fine line structure being produced by gape in an otherwise all-over print, whereby one can produce not only straight lines but also other ones, for example guilloches or microprints of alphanumeric characters, which are then overprinted flat with the optically variable colors. For overprinting the fine line structure one can use optically variable colors which contain one, several and/or different optically variable pigments, for example liquid-crystal silicone polymers or iridescent pigments. Obviously it is also possible to provide the color containing the optically variable pigments, and/or the color of the fine structure background, with luminescent, magnetic, conductive or other feature pigments.

To attain particular effects one can also coordinate the color used to produce the structure with the color of the optically variable pigments applied thereto, so that the color of the optically variable element and the color of the background are the same at certain viewing angles. The optically variable substance or color, which is applied so as to overlap in an area of the structure, contains optically variable pigments having no, or only slight, body color of their own, such as in particular interference layer pigments or pigments produced on the basis of liquid-crystal polymers. They can be printed on the particular structures produced by the first ink in such a way as to cover them all over, even overlap them or cover only a part of the structure in certain shapes, characters or patterns.

Furthermore the inventive method is not restricted to producing the optically variable element directly on the data carrier. Instead it is also possible to produce the optically variable element on a separate carrier and then transfer the element to the data carrier using one of the known transfer methods. The optically variable element can thereby also be realized as a printed optically variable foil, in particular one provided with a fine line print.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A data carrier for paper of value comprising:

an optically variable security element having at least one piece of information and one transparent, optically variable layer containing optically variable pigments;

the at least one piece of information being represented in a color contrasting with the data carrier, and the optically variable layer disposed at least in partial areas over the at least one piece of information; and wherein the at least one piece of information has a structure selected from the group consisting of a fineness and line width, each of which is thinner than that which can be created by using the optically variable pigments.

2. The data carrier of claim 1, wherein the at least one piece of information has a gap.

3. The data carrier of claim 1, wherein the at least one piece of information has a uniform color and uniform color tone.

4. The data carrier of claim 1, wherein the at least one piece of information has different colors.

5. The data carrier of claim 1, wherein the at least one piece of information is at least in part dark, in particular black.

6. The data carrier of claim 1, wherein the optically variable layer includes one or more interference layer pigments produced by liquid-crystal polymers.

7. The data carrier of claim 1, wherein the at least one piece of information is selected from the group consisting of a half-tone image, a line screen, a dot screen, a portrait, a picture motif, a logo, a character and a text.

8. The data carrier of claim 1, wherein the optically variable layer is applied flat in a geometric shape.

9. The data carrier of claim 1, wherein a plurality of optically variable layers which can each contain different optically variable pigment are disposed on the information.

10. The data carrier of claim 1, wherein the optically variable element is combined with a print on a side of the data carrier opposite the optically variable element in such a way that total information becomes recognizable in an area of the optically variable element by transmitted light.

11. The data carrier of claim 1, wherein the information is printed.

12. The data carrier of claim 1, wherein the at least one piece of information has a plurality of gaps.

13. The data carrier of claim 1, wherein the at least one piece of information has different color tones.

14. The data carrier of claim 1, wherein the optically variable layer is applied flat in character form.

15. The data carrier of claim 1, wherein the optically variable layer is printed.

16. The data carrier of claim 8 wherein the optically variable layer is overprinted with a print which represents information.

17. An optically variable security element comprising:

at least one piece of information and one transparent, optically variable layer containing optically variable pigments, the information being represented in a color contrastable with a data carrier and the optically variable layer being disposed at least in partial areas over the information, and wherein the at least one piece of information has a structure selected from the group consisting of fineness and line width, each of which is thinner than that which can be created by using the optically variable pigments.

18. The optically variable security element of claim 17, wherein the optically variable security element is disposed on a transfer band.

19. The optically variable security element of claim 17, wherein the information is at least in part a dark color.

20. The optically variable security element of claim 17, wherein the optically variable layer is an optically variable film.

21. The optically variable security element of claim 19, wherein the dark color is black.

* * * * *